July 10, 1962 — L. C. WALTER — 3,043,004
TUBE SPLITTING TOOL
Filed May 25, 1960

INVENTOR.
L. C. WALTER
BY John H. Widdowson
ATTORNEY

United States Patent Office 3,043,004
Patented July 10, 1962

3,043,004
TUBE SPLITTING TOOL
Leland C. Walter, 910 S. High St., El Dorado, Kans.
Filed May 25, 1960, Ser. No. 31,637
5 Claims. (Cl. 30—91)

This invention relates to a tube splitting tool. More particularly, the invention relates to a new tool designed specifically for splitting tubes and the like which can be adjusted to receive and cut or split tubes of various sizes. Still more specifically, the invention relates to a tube splitting tool which receives and grips a tube, and which can then be adjusted so that a cutting edge is in engagement with the tube so that the tool can be rocked or moved along the tube axis to split the tube. The tool has particular application in removing a muffler from an automobile.

Heretofore, various types of tools have been known to the art which were designed for splitting or removing a tube or the like. These tools are primarily large bulky items which are difficult to adjust and unsatisfactory in operation. Furthermore, they are so designed that it is difficult, if not impossible, to be used with tubes mounted in areas where it is difficult to get to the tube itself, such as in the typical automobile exhaust system.

In accordance with the present invention a new tube splitting tool has been provided which will receive the end of a tube, conduit, pipe or the like, and tightly grip it with a cutting edge in contact with one side thereof. The tool is then oscillated or rocked along the axis of the pipe, conduit, etc., which causes the tube to split. Means are preferably provided to make the tool adjustable to receive various sizes of conduit and the like, and suitable indicators can be provided to show the size of conduit to be received within the tool when it is adjusted to any particular position.

Accordingly it is an object of the present invention to provide a new tool.

Another object of the invention is to provide a new tube splitting tool which is adjustable to receive tubes or conduits of various sizes.

Another object of the present invention is to provide a new tube splitting tool particularly designed for use with an automobile exhaust system, or in other similar applications where the end of a tube or pipe must be split prior to removal of the pipe.

A further object of the invention is to provide a new tube splitting tool which is economically manufactured primarily of stock material and which can be easily assembled or disassembled.

A still further object of the invention is to provide a new tube splitting tool which has suitable pointed tube gripping members to tightly grip the pipe or the like during the splitting operation.

Various other objects, advantages and features of the invention will become apparent from the following description taken in connection with the accompanying drawings, in which.

Figures 1, 2, 3:
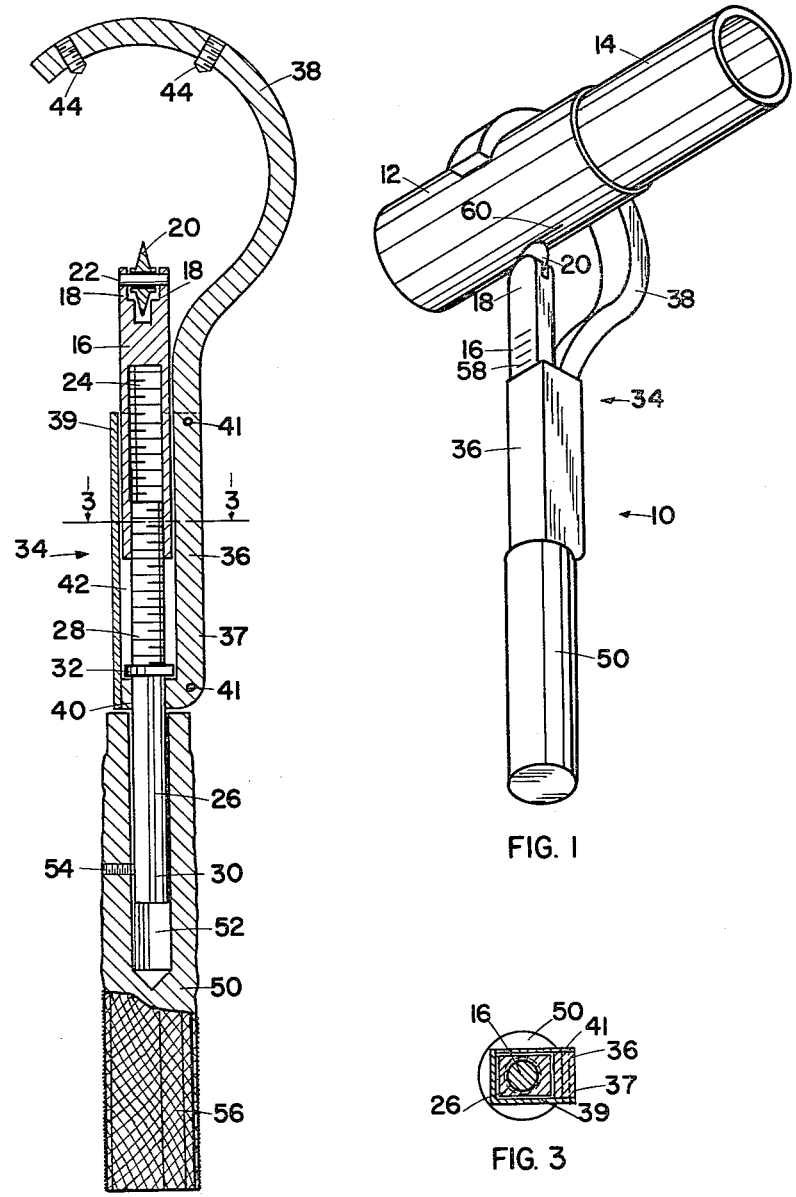
FIG. 1 is an isometric view of a preferred embodiment of the tube splitting tool of the invention showing the tool in position to split a pipe.
FIG. 2 is an enlarged side view, partly in cross section, showing the tube splitting tool of FIG. 1.
FIG. 3 is a cross section view taken along the line 3—3 of FIG. 2.

The following is a discussion and description of a preferred specific embodiment of the new tube splitting tool of the invention, such being made with reference to the drawings whereon the same reference numerals are used to indicate the same or similar parts and/or structure. It is to be understood that such discussion and description is not to unduly limit the scope of the invention.

Referring now to the drawings in detail, the new tube splitting tool of the invention is shown in its preferred application in FIG. 1 of the drawings. The tool, shown generally at 10, receives and tightly grips a pipe or tube 12. The pipe 12 is shown as having mounted therein a second pipe or conduit 14 in one end therof. The tool 10 is particularly useful in disconnecting a muffler from the tail and/or exhaust pipes of an automobile. Thus, the pipe 12 can be part of the muffler and pipe 14 can be the exhaust pipe, or the pipe 12 can represent the tail pipe and pipe 14 the end of a muffler. After a period of use a rust bond often develops between the elements 12 and 14, requiring the outer pipe 12 to be split at the end to disengage them. This application is merely illustrative, and should not be considered a limitation, since the device obviously can be used in any cutting or splitting application.

The various elements of the tube splitting tool of the invention are best shown in FIG. 2. An elongated bar 16 is provided and is preferably bifurcated at one end to provide a yoke of two spaced supports 18. A circular cutting wheel 20 is mounted between the supports 18 by an axle 22 which is suitably secured in the supports 18 and passes through the center of the cutting wheel 20. The wheel 20 is rotatably received on the axle 22. Other types of cutting means can also be used, if desired. The bar 16 can be made from standard rectangular stock material of a suitable size. The other end of the bar 16 has a hollow 24 formed therein which extends through the major length of the bar 16 and is preferably formed along the longitudinal axis of the bar. The hollow 24 is preferably internally threaded as shown in FIG. 2.

An elongated shaft 26, which is externally threaded at one end thereof as shown at 28, is dimensioned so as to be threadedly received within the hollow 24 of the bar 16. The shank end 30 of the shaft 26 extends from the end of the bar 16. A retaining collar 32 is mounted on shaft 26, and is preferably positioned on the shaft 26 to separate the threaded end thereof from the shank end 30. Any suitable mounting means can be used, such as threaded mounting on threaded end 28.

An elongated gripping member 34 for gripping tube 12 is provided which has a base portion 36 and an extending portion 38. The base portion 36 is generally rectangular in transverse cross section and is preferably hollow over its entire length and open at both ends. A shoulder 40 is formed at the end of the base portion 36 remote from the extended portion 38 by the hollow interiior 42 being reduced in diameter. The bar 16 with the cutting wheel 20 and the shaft 26 mounted thereon is received in the base portion 36 of the tube gripping member 34 as shown in FIG. 2.

The extended portion 38 of the tube gripping member 34 extends in a generally semi-circular manner from the base portion 36 to overlie and be spaced from the cutting wheel 20. The extended portion 28 can be made with other contours, since it is only important that it be spaced from the cutting wheel 20 and have means to grip a pipe, tube or the like during the cutting operation. Two gripping points or tube gripping elements 44 are mounted in the end of the extended portions. The two points 44 are preferably threadedly received in the extended portion 38 to be adjustably and removably mounted therein. The points 44 can be simply a pointed screw or the like of standard construction to facilitate and simplify construction and assembly of the device. These points 44 are preferably mounted in the extended portion 38 so that they are an equal distance on each side of the plane of the cutting wheel 20. This adds additional stability to the tool during the cutting operation.

The tube gripping member 34 can be constructed of one piece of material, however in some applications it is found to simplify production and manufacture to form the extended portion 38 and the adjacent side of the base portion 36 of a single bar of material 37, and to complete the hollow base portion 36 by a U-shaped sheet of lightweight material 39 secured thereto by pins 41. This particular construction is shown in the drawings for illustration purposes and is best seen at FIGS. 2 and 3.

The opening 42 in the base portion 36 of the gripping member 34 is adapted to slidably receive the bar 16 therein with the shaft 26 and the collar 32 mounted in place. When thus assembled the cutting wheel extends from the one end thereof beneath the gripping points 44 and the collar 32 engages the shoulder 40 with the shank portion 30 of the shaft 26 extending from the base or inner end of the portion 36.

An elongated preferably metallic handle 50 is provided which has an aperture or hole 52 in one end thereof. The hole 52 receives the shank portion 30 of the shaft 26. The handle 50 is mounted on the shaft 26 by a lock screw 54 which passes through the side of the handle 50 and engages the shank portion 30 to make the two parts rigid relatively to each other. The outer surfaces of the handle is preferably knurled as shown at 56 to provide a good gripping surface during operation of the tool.

With the device assembled in the manner described, when the handle 50 is rotated, the bar 16 will be raised or lowered within the base portion 36 of the tube gripping member 34 due to the interaction between the internally threaded hole 24 and the externally threaded portion 28 of the shaft 26. A plurality of graduations or indicators 58 can be formed on the side of the bar 16 to visually indicate the size of tube that will be received between the points 44 and the cutting wheel 20 when the bar 16 is in any position relative to the base portion 36 of the tube gripping member 34.

In operation, the tool is placed around the pipe or conduit 12 which is to be split, with the gripping points 44 overlying and in engagement with the tube 12. The handle 50 is then rotated to adjust the position of the bar 16 and the attached cutting wheel 20 so that the wheel 20 is in engagement with the opposite side of the tube 12. The handle 50 is then oscillated in a direction generally parallel to the axis of the tube 12, which moves the cutting wheel 20 back and forth along the surface of the pipe or conduit 12 to cut or split the pipe 12 open. If necessary, the handle 50 can be readjusted to place the cutting wheel 20 in tight engagement with the pipe 12 as the cutting operation proceeds. The bar 16 can be backed off and the tool moved along the axis of the pipe or conduit 12 so that the cut, shown generally at 60 in FIG. 1, can be extended along the pipe or conduit.

When used on the exhaust system of automobiles, a tail or exhaust pipe can be removed from the muffler of an automobile in just a few strokes of the tool. A tool such as the one just described is almost essential in this operation, since the pipes are usually rusted together at the connection, and in the absence of such a tool it is often necessary to cut the end of one of the pipes or conduits entirely off by sawing.

It will be evident from the foregoing description that the objects of the invention have been met by providing a new and simple tube splitting tool which is easy to construct, economical to manufacture and simple in operation. The individual parts are made primarily from stock items. Furthermore the tool is small and compact which makes it more suitable for use in its intended application and more convenient to carry in a tool box or the like.

While the invention has been described in connection with a preferred specific embodiment thereof, it will be understood that this description is intended to illustrate and not to limit the scope of the invention, which is defined by the claims.

It will be evident to those skilled in the art, that various modifications of this invention can be made, or followed, in the light of this description and discussion, without departing from the spirit of the disclosure or the scope of the claims.

I claim:

1. A tube splitting tool of the type described comprising, in combination, an elongated bar, said bar being bifurcated at one end thereof to form a yoke, a circular cutting wheel, an axle passing through the axis of said cutting wheel and through the bifurcated end of said bar to thereby mount said cutting wheel on said bar in said yoke, an internally threaded hole in the other end of said bar extending the major length of said bar along the longitudinal axis thereof, an elongated shaft having a shank end and an externally threaded end, a thrust collar, said thrust collar being internally threaded and mounted on the threaded end of said shaft, said shaft with said collar thereon being removably secured in and extending from said hole in said bar, an elongated tube gripping member having a base portion and an extending portion, said base portion being generally rectangular in transverse cross section, hollow over its length and open at its ends, a shoulder formed in the end of said base portion remote from said extended portion by the opening in the inner end of said base portion being reduced in diameter, said base portion of said gripping member adapted to slidably receive said bar with said shaft and collar mounted therein within said base portion so that said cutting wheel extends from one end thereof and the shank portion of said shaft extends from the other end thereof with said collar in contact with said shoulder, said extended portion of said tube gripping member being generally semi-circular and overlying and spaced from said cutting wheel, two gripping points threadedly secured in the extended portion of said member, said gripping points being mounted in said extended portion overlying said cutting wheel and spaced an equal distance on each side of a plane passing through said wheel, an elongated metallic handle for said tool, said handle being knurled and having a hole in one end thereof, said hole in said handle receiving the shank portion of said shank, a lock screw passing through said handle and engaging said shank portion of said shaft to removably mount said handle on said shaft and to prevent rotation between said shaft and said handle, said tool being constructed and adapted so that said tube gripping member can surround a tube and be retained thereon by said gripping points, and said cutting wheel can be placed in cutting engagement with the other side of said tube by rotating said handle which moves said elongated bar relative to said base portion of said tube gripping member, and said tool can then be rocked about said gripping points to cut or split said tube.

2. A tube splitting tool of the type described comprising, in combination, an elongated bar, a circular cutting wheel, means mounting said cutting wheel at one end of said bar, an internally threaded hole in the other end of said bar along the longitudinal axis thereof, an elongated shaft, said shaft being externally threaded over at least a portion of its length, a thrust collar mounted on said shaft, said shaft with said collar mounted thereon being removably secured in and extending from said hole in said bar, an elongated and relatively thin tube gripping member having a base portion and a generally semicircular extending portion, said base portion being hollow over its length and open at its ends, a shoulder formed in one end of said base portion, said hollow base portion being adapted to slidably receive said bar with said shaft and collar mounted therein so that said cutting wheel extends from one end thereof and said shaft extends from the other end thereof with said collar in contact with said shoulder, the cutting plane of said cutting wheel being parallel to the axis of said semicircular extending portion, said extending portion of said tube gripping member overlying and spaced from said cutting wheel, pointed means on the inside of an outer end portion of said extending portion of said tube gripping member to grip a tube with said pointed means embedded in said tube to provide in operation a fixed pivot point for said tool, a handle for said tool, said handle being hollow to receive the extending end of said shaft, locking means securing said handle to said shaft for rotation therewith, said tool being constructed and adapted so that said tube gripping member can surround a tube and be retained thereon with said tube gripping member fixedly gripping said tube to provide a fixed pivot point on said tool, and said cutting wheel can be adjusted to be placed in cutting engagement with a side of said tube by rotating said handle which moves said elongated bar relative to said base portion of said tube gripping member, and said tool can then be oscillated along the tube axis to cut or split said tube longitudinally.

3. A tube splitting tool of the type described comprising, in combination, a bar, said bar having an internally threaded hole in one end thereof, cutting means mounted on the other end of said bar, an elongated shaft externally threaded along one end thereof, a thrust collar mounted on said shaft, said threaded end of said shaft being received in said hole in said bar having a relatively thin and generally semicircular outer end portion adapted to receive therethrough an elongated hollow member with said hollow member being approximately concentric with said gripping member, said cutting means having a cutting member mounted and positioned with the cutting plane thereof being generally parallel to the axis of said outer end portion of said gripping member, an elongated tube gripping member, said tube gripping member being hollow over part of the inner end portion thereof, a shoulder partially closing one end of said tube gripping member, said hollow portion of said tube gripping member receiving said bar with said shaft and collar secured thereto with said collar in contact with said shoulder, a handle secured to the other end of said shaft for rotation therewith, pointed means on the inside of said outer end portion of said tube gripping member overlying and spaced from said cutting means to tightly grip a tube or the like with said pointed means embedded in said tube or the like to provide in operation a fixed pivot point for said tool, said tool being constructed and adapted so that said tube gripping member can surround a tube to be retained thereon with said gripping member fixedly gripping said tube to provide a fixed pivot point for said tool and said cutting means can be placed in engagement with said tube by rotating said handle which moves said bar relative to said tube gripping member and said tool can then be rocked about said fixed pivot point formed by said pointed means to longitudinally cut or split said tube.

4. A tool comprising, in combination, a relatively thin and elongated gripping member having an outer end portion generally semicircular in shape and adapted to receive therethrough an elongated hollow member with said hollow member being approximately concentric therewith, pointed pressure embedding means mounted on the inside of said outer end portion of said gripping member and positioned thereon to in use fixedly engage the outer surface of a hollow member positioned in said outer end portion of said gripping member with said pointed means providing a pivot point around which said tool is pivoted to move tool axially relative to said hollow member, cutting means adjustably mounted on said gripping member and adjustable relative to said pointed means to vary the distance therebetween, said cutting means having a circular cutting member mounted and positioned with the cutting plane thereof parallel to the axis of said outer end portion of said gripping member, handle means with the other end portion of said gripping member and operatively connected to said cutting means to adjust same in use, and said tool being constructed and adapted to in operation be pivoted about said pointed means when embedded in a hollow member or the like positioned therein with said cutting member in engagement with said hollow member with said cutting member movable longitudinally relative to said hollow member to split same.

5. A tool comprising, in combination, a relatively thin and elongated gripping member shaped generally semicircular in an outer end portion and adapted to receive therethrough an elongated hollow member with said hollow member approximately concentric with said gripping member, hand gripping means mounted on an opposite end portion of said gripping member, said gripping member having pointed pressure embedding means on the inside of an outer end portion of said generally semicircular end portion to in application fixedly engage the outer surface of a hollow member mounted in said semicircular portion of said gripping member with said pointed means providing a fixed pivot point around which said tool is pivoted, cutting means adjustably mounted on said gripping member opposite said pointed means and operable to vary the distance between same and said pointed means, said cutting means having a cutting member mounted and positioned with the cutting plane thereof parallel to the axis of said semicircular portion, and said tool being constructed and adapted to in operation be pivoted about said pointed means embedded in a hollow member mounted in said gripping member and with said cutting member oppositely engaging said hollow member in longitudinal splitting relation.

References Cited in the file of this patent
UNITED STATES PATENTS

| | | |
|---|---|---|
| 1,244,299 | Dean | Oct. 23, 1917 |
| 2,065,138 | Lang | Dec. 22, 1936 |
| 2,457,540 | Fasoldt | Dec. 28, 1948 |
| 2,561,099 | Costelow | July 17, 1951 |
| 2,629,926 | Franck | Mar. 3, 1953 |
| 2,649,654 | Carta | Aug. 25, 1953 |
| 2,814,867 | Charles | Dec. 3, 1957 |
| 2,830,366 | Chisena | Apr. 15, 1958 |
| 2,875,516 | Parks | Mar. 3, 1959 |

FOREIGN PATENTS

| | | |
|---|---|---|
| 24,695 | Great Britain | of 1901 |

UNITED STATES PATENT OFFICE

CERTIFICATE OF CORRECTION

Patent No. 3,043,004                 July 10, 1962

Leland C. Walter

It is hereby certified that error appears in the above numbered patent requiring correction and that the said Letters Patent should read as corrected below.

Column 2, line 48, for "interiior" read -- interior --; column 4, line 41, for "shank" read -- shaft --.

Signed and sealed this 30th day of October 1962.

(SEAL)
Attest:

ERNEST W. SWIDER
Attesting Officer

DAVID L. LADD
Commissioner of Patents